US009968865B1

United States Patent
Wu et al.

(10) Patent No.: US 9,968,865 B1
(45) Date of Patent: May 15, 2018

(54) MULTIPLE EFFECT WITH VAPOR COMPRESSION DISTILLATION APPARATUS

(71) Applicants: Wei Wu, Orlando, FL (US); Yan Jin, Orlando, FL (US)

(72) Inventors: Wei Wu, Orlando, FL (US); Yan Jin, Orlando, FL (US)

(*) Notice: Subject to any disclaimer, the term of this patent is extended or adjusted under 35 U.S.C. 154(b) by 0 days. days.

(21) Appl. No.: 15/687,016

(22) Filed: Aug. 25, 2017

(51) Int. Cl.
| | |
|---|---|
| B01D 3/00 | (2006.01) |
| B01D 3/14 | (2006.01) |
| B01D 1/28 | (2006.01) |
| B01D 5/00 | (2006.01) |
| B01D 1/22 | (2006.01) |
| B01D 3/42 | (2006.01) |
| C02F 1/04 | (2006.01) |
| C02F 1/08 | (2006.01) |
| C02F 103/08 | (2006.01) |

(52) U.S. Cl.
CPC ............. *B01D 3/146* (2013.01); *B01D 1/221* (2013.01); *B01D 1/28* (2013.01); *B01D 3/002* (2013.01); *B01D 3/42* (2013.01); *B01D 5/006* (2013.01); *C02F 1/041* (2013.01); *C02F 1/08* (2013.01); *C02F 2103/08* (2013.01)

(58) Field of Classification Search
USPC ................. 202/174, 187; 203/12, 53, 88, 89
See application file for complete search history.

(56) References Cited

U.S. PATENT DOCUMENTS

| | | | | |
|---|---|---|---|---|
| 4,402,793 A | * | 9/1983 | Petrek ..................... | B01D 1/22 202/174 |
| 9,539,522 B1 | * | 1/2017 | El-Sayed ................ | B01D 1/26 |
| 9,802,836 B2 | * | 10/2017 | Thiers .................... | B01D 1/305 |
| 2010/0307910 A1 | * | 12/2010 | Engelhart ............ | B01D 1/0035 203/21 |
| 2011/0061867 A1 | * | 3/2011 | Bjorklund ........... | E21B 41/0057 166/272.1 |
| 2017/0014773 A1 | * | 1/2017 | Swaminathan ...... | B01D 61/364 |

* cited by examiner

*Primary Examiner* — Nina Bhat

(57) ABSTRACT

Multiple effects with vapor compression distillation apparatus includes a plurality of parallel cylinders or plates for recovery of heat having opposed evaporation and condensation faces for alternately evaporating and condensing. There are forward, backward and parallel feeding method to the upper end of the cylinders or plates for gravity flow along the evaporator face of the cylinders or plates with vapor condensing on the opposite condensation faces. Compressor is included as means for collecting and recovering the condensed product from the system. Alternate embodiments including a solar heat input system and other combined configurations.

19 Claims, 14 Drawing Sheets

MULTIPLE EFFECT WITH VAPOR COMPRESSION DISTILLATION APPARATUS

BACKGROUND OF THE INVENTION

The present invention relates to sea water multiple effects desalination (MED) or distillation process including chemical distilling. This multiple effect distillation systems are applied to multiple effect evaporator, multistage flash evaporator and solar distillation apparatuses etc. Multistage flash evaporator is complicated and large and the heat efficiency is not so good. Solar distillation apparatuses hitherto used are so-called basin type and the distilling process is a stationary one the efficiency is low too. Commercial distillation systems utilize a simple boiler for bringing the liquid to its boiling point to vaporize the liquid and sent the vapor into a condenser where it is condensed and the heat is recovered. Such systems have no consideration of the cost of energy.

Desalination (MED) or distillation systems can be integrated with a compressor to compress the vapor back but it requires a considerable amount of energy in order to properly function. United States have inadequate supplies of fresh or potable water due to the climate change of our earth. Although salt water is available in many of areas, economical and effective means of converting it to fresh water is not available. Distillation is one method available for recovering fresh water from salt water. The prior art distillation systems are not sufficiently effective and economical to solve this problem.

SUMMARY AND OBJECTS OF THE INVENTION

The use of a vapor zigzag flow path distillation process, that is evaporation and condensation of the vapors in a zigzag way, for the separation of binary phase and multiple phase liquids is invented. With a turbine or screw expander assisting, the apparatus compressor can compress vapor back to recollect the latent heat from the vapor to save energy and it can drive the generator to charge re-chargeable battery. The permanent magnet generator or motor is discussed and described in the background of U.S. Pat. No. 8,829,742 "High efficiency permanent magnet machine", issued Sep. 9, 2014 to Mr. Wei Wu, inventor hereof. The aforementioned patent covers a novel approach to build high efficiency generator to be integrated into this distilling system to have the separation of liquid phases. This patent application discloses and is directed to sea water mass transfer process from laminar flowing.

A simple and inexpensive liquid phase separation system or a simple and inexpensive liquid phase distillation with internal zigzag flow pattern is shown and it is energy efficient to operate. A multiple effect distillation system with vapor compression includes a plurality of closely spaced parallel transfer partition cylinders or plates defining a plurality of zigzag vapor chambers having opposed evaporating and condensing faces and for establishing a heat flux across the plurality of partition cylinders or plates with the cylinders or plates disposed at horizontal, vertical direction. It can be used at 5°~89° angle to enable gravity flow of a liquid along the faces of the partition cylinders or plates from, an upper edge to a lower edge with means for feeding and controlling a thin film liquid onto the evaporating face. Another embodiment provides a level sensor for controlling fluid flow during distillation and the level sensor coupled with a variable flow valve controlled by the fluid level in the system.

BRIEF DESCRIPTION OF THE DRAWINGS

The above and other objects and advantages of the present invention will become apparent from the following description when read in conjunction with the drawings, wherein.

DETAILED DESCRIPTION

The methods and apparatus of the present invention are directed to the separation of components of a fluid, primarily liquids like sea water, alcohol etc. The apparatus accept incoming raw water and perform pretreatment and involves the evaporation of the more volatile components of the fluid and the collection and condensation of the vapors, thereby separating the more volatile component from the other components of the liquid or fluid.

Figure 1:
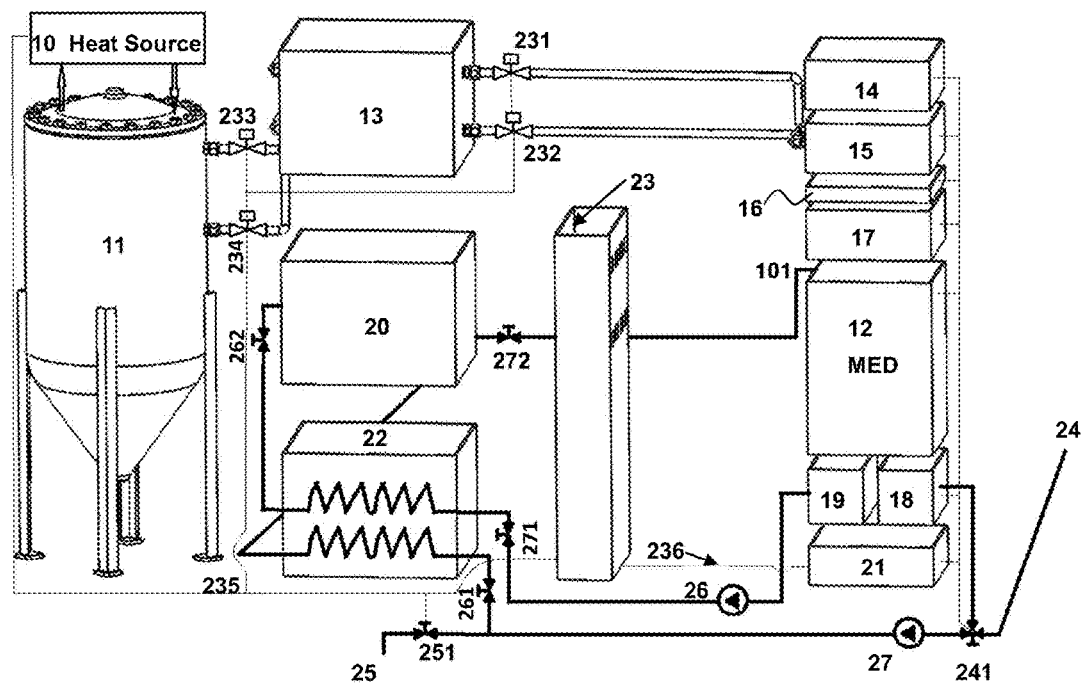
FIG. 1 is a diagrammatic view of distillation apparatus.

FIG. 1 is a diagrammatic view of distillation apparatus. The apparatus include heat source 10 situated adjacent to TES tank 11 to provide about three days energy storage. What inside tank is usually salt, wax or oil. Then working fluid 13 carries the energy to a turbine or screw expander 15 to generate power by generator 14. Then working fluids are usually Freon, for e.g., R134a with low boiling point. There is a coupler 16 to control the load of compressor 17 and its function is to compress the vapor back to MED 12. Seawater can be separated to be fresh water 19 and concentrated seawater 18 through distilling process inside the MED. Seawater feed 24 is carried by salty water pump 27 to have the heat exchanged in heat exchanger 22. Fresh water 19 heats the incoming seawater and it is pumped by fresh water pump 26 to product reservoir 20. The working fluid system is controlled by smart valve 231, 232, 233 and 234 which has embedded sensor. The water system is controlled by smart valve 251, 261, 271 and 272. The apparatus is controlled by a control and communication unit 23. The apparatus can also be utilized for the separation of liquids having multiple components of different volatility such as alcohol and water, or the various phases of a hydrocarbon such as crude, as well as for the separation of potable water from brackish and seawater.

A heat source 10 is used to power the overall system. Heat source 10 is coupled to a generator 14 and a turbine or screw expander 15 to drive compressor 17, compressor is driven by co-axial turbine or screw expander. The turbine or screw expander 15 turns the generator 14 and it provides electrical energy to the battery 21. Heat source 10 may be, in some cases, an electrical outlet, a standard internal combustion (IC) generator or an external combustion generator. Comparing to solar energy, an IC generator and an external combustion generator waste both mechanical and thermal energy. The generator 14, such as a permanent magnet brushless motor, is coupled to a crankshaft of the turbine or screw expander 15 and converts the mechanical energy to electrical energy. It should be understood to one of ordinary skill in the art that the term generator encompasses the class of electric machines such as generators wherein mechanical energy is converted to electrical energy or motors wherein electrical energy is converted to mechanical energy. The generator 14 is preferably a permanent magnet brushless motor. A rechargeable battery 21 provides starting power for the control unit 23 as well as direct current ("DC") power to be converted to alternating current ("AC") power to pumps 26 and 27. An inverter is embedded at control unit 23 and is coupled to the battery 21 in order to convert the DC power produced by battery 21 to AC power. In the embodiment shown in FIG. 1, the battery 21 is under the MED, inverter and AC power output 235 and 236 are disposed close to an enclosure 23. In a preferred form the product liquid is passed through the heat exchanger 22 for transferring heat therefrom to a feed water source, or source of liquid fed into the system by way of conduit through controlled valve 261 and 271, which is then mixed with any recycle fluid at juncture 241 for feeding back into the feed reservoir 18 of the system. The drained wasted seawater is by way of conduit 25 through controlled valve 251. A pump 27 recycles a portion of the feed stock drawn thereto by way of conduit 24. This is all fed back into the MED intake 101 by way of conduit through controlled valve 272.

A minimum depth of water is preferably maintained in the lower reservoir. In the event heat source water 101 were used, the introduction of is approximately 85 to 115 degrees C. depend on controlled pressure. At startup, the initial fluid level for the liquid pump is preferably supplied from source water.

A conductivity sensor (not shown) may be used to determine total dissolved solid (TDS) content by measuring the electrical conductivity of the fluid. In a particular embodiment, the sensor is an inductive sensor, whereby no electrically conductive material is in contact with the fluid stream. If the TDS content in product reservoir 20 rises above a prescribed level, for example, during distillation of sea water, the fluid source feed rate should be increased. Because increasing the fluid source feed rate will increase the rate of stream 126, and an increased stream rate results in reduced concentration of TDS, thereby maintaining overall efficiency and productivity of the system. Fluid control is achieved by using level sensors and variable flow valves in a feedback configuration. Optimal operation of the MED requires total fluid flow in to closely match total fluid flow out. Maintaining fluid levels in the MED at near constant levels accomplishes this requirement. In a particular embodiment, the sensors are capacitive level sensors, a particularly robust sensor for measuring fluid levels. In a particular embodiment of the invention, a valve block (not shown) may be utilized to consolidate all control valves for the system into a single part, which may be integrated with the fluid flow manifold. It may be possible to remotely monitor and control the vending apparatus including generator, turbine or screw expander, coupler, compressor and the vacuum device. The remote monitoring system may track information such as, but not limited to. a usage profile, the amount of water dispensed daily etc; if the water runs out or if it remains full at the end of the day, remotely change the production rate of the production apparatus and the supply of the water usage in the area. Using the remote monitoring system, flow rate, water consumption, production and efficiency may be monitored as well. The system may also monitor the information about forming the vessels if the embodiment implementing the bottle forming process along with the remote monitoring of the system. The remote monitoring may send signals on general health of the apparatus, such as the temperature of the purification system, the pressure used in purification, the power used in the device, quality of product water, flow rate etc.

Communication system 23 enables a variety of improvements, by enabling communication with a monitoring station. For example, the system 23 may monitor the location of the MED to ensure that use in an intended location by an intended user. Additionally, it may monitor the amount of water and/or electricity produced, which may allow the calculation of usage, charges. Additionally, the determination of the amount of water and/or electricity produced during a certain period or the cumulative hours of usage for the calculation of a preventative maintenance schedule. If it is determined that a maintenance call is required, either by the calculation of usage or by the output of the sensors used to determine water quality, the system 23 may arrange for a maintenance visit. In the case that a GAS (Global Positioning System) locator is in use, system 23 may determine the precise location of the MED to better facilitate a maintenance visit. The system 23 may also determine which water quality or other tests are most appropriate.

Post-treatment of the distilled product, preferably water, may occur preferably within an external output region (not shown). Post-treatment operations may include minerals because our product is distilled water and the total dissolved solid is ~10 which is minimal comparing to city tap water ~200. In such embodiments, the ability to detect purified liquid TDS is preferred. Detection systems in accordance with embodiments of the present invention include pH analysis, conductivity and hardness analysis (not shown). Such detection systems can trig a signal mechanism when the water quality needs to be monitored. Liquid characteristics, for example water hardness, is also monitored at the output and may be coupled with an indicator mechanism which signals the appropriate minerals should be added. Knowledge of operating temperatures, TDS, and fluid flows provides information to allow production of potable water under a wide range of ambient temperatures, pressures, and dissolved solid content of the source water. One particular embodiment may utilize a control method whereby such measurements (T, P, TDS, flow rates, etc) are used in conjunction with a simple algorithm and look-up table allowing an controller 23 to set operating parameters for optimum performance under existing ambient conditions.

Figure 2:
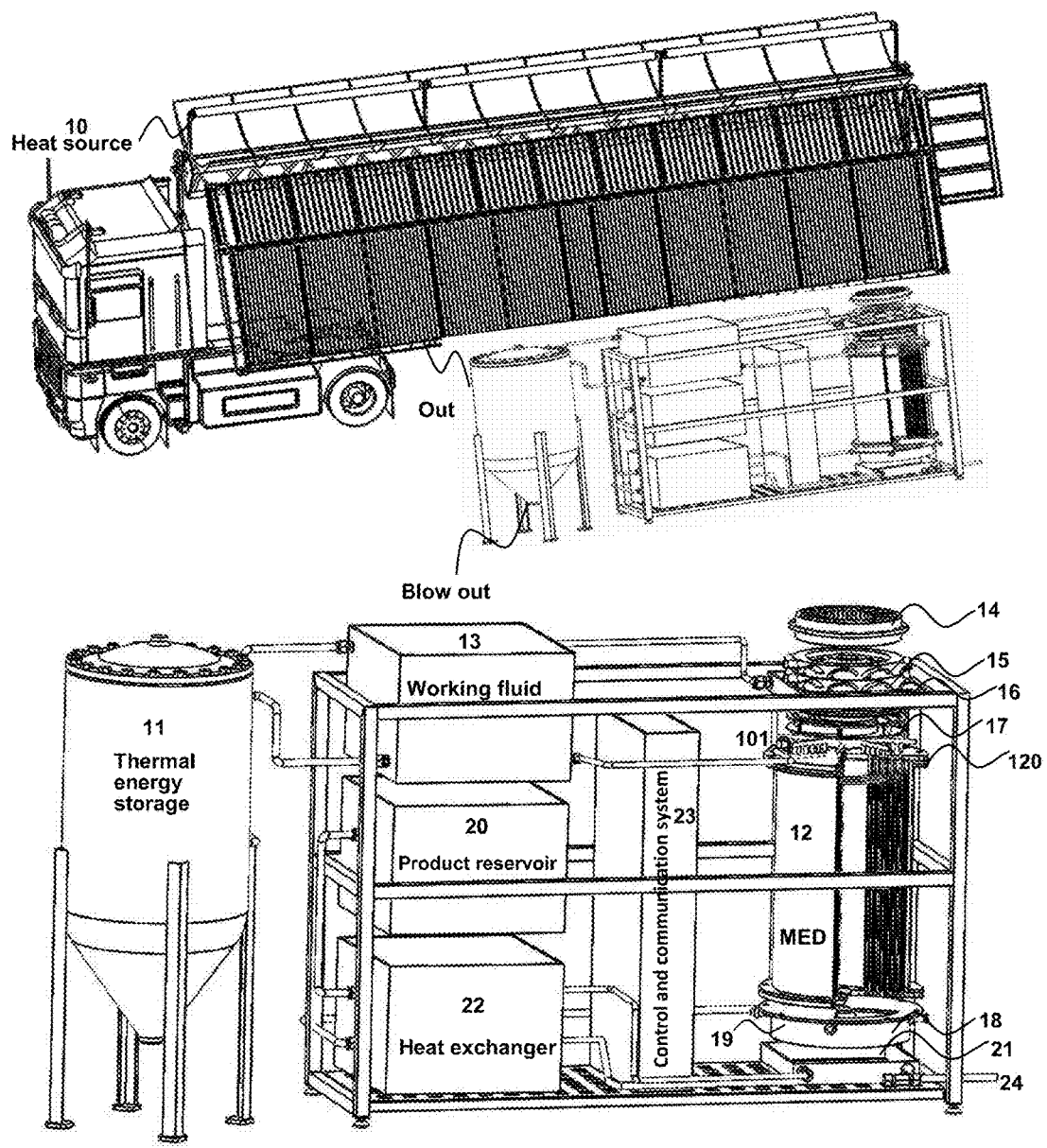
FIG. 2 is an overall view and blow out side elevational view with parts in section.

FIG. 2 is an overall view and blow out side elevational view with parts in section, a solar distillation system in accordance with the invention shown system of FIG. 1. Heat source is designated generally by the numeral 10, consists essentially of a solar collecting modular unit. The main component is a multiple effects or chambers (MED, 12) which having multiple concentric surface or face on one side and a heat rejection or radiation face or cylinder or plate on the opposite side or face.

A preferred construction of the system is illustrated. As shown in FIG. 2 the system includes a solar collection or a long heat input cylinder having a blackened solar collection face to heat the working fluid 13. A transparent sheet of glass or similar glazing material covers the solar collector thereby defining what is typically termed a parabolic glazed collection solar panel. The glass long cylinder is mounted in a suitable parabolic frame or bracket with the usual sealing and insulating materials as preferred. Spaced adjacent to and extending parallel to the parabolic half cylinder. The heat output cylinder may be incorporated in a heat exchanger 22 for transferring the heat therefrom for disposal or to introduce as pre-heat into the feed water for the system from TES tank 11.

Figure 3:
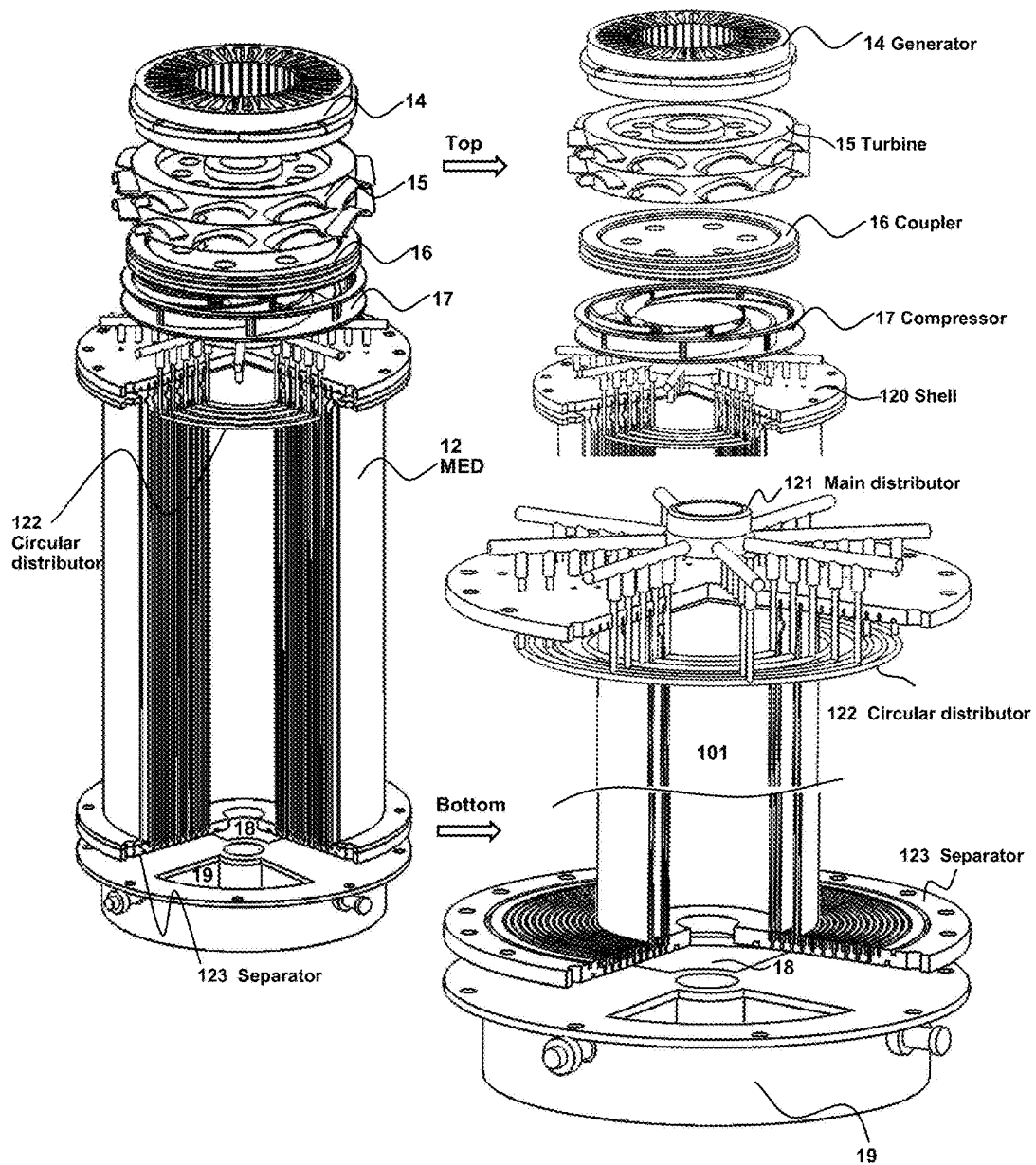
FIG. 3 is a detailed view of a portion of the invention showing details of MED structure.

FIG. 3 is a detailed view of a portion of the invention showing details of MED structure. At the upper end of the unit, a feed reservoir or main distributor 121 communicates with circular distributor 122 and feeds a liquid onto the backside or evaporator face of the cylinders or plates into the various chambers of the system. A collection and separator 123 with two chambers collect the separated liquids to be fresh water 18 and concentrated seawater 19 at the bottom or lower end of the unit 12 and communicates to product reservoir 20. The whole MED can have airtight due to the shell 120. In the simplest form of the invention an overflow line or conduit 24 is provided to simply maintain a constant level of fluid within the feed reservoir 18. This eliminates complicated controls from the system, thus providing a simple inexpensive system.

Figure 4:
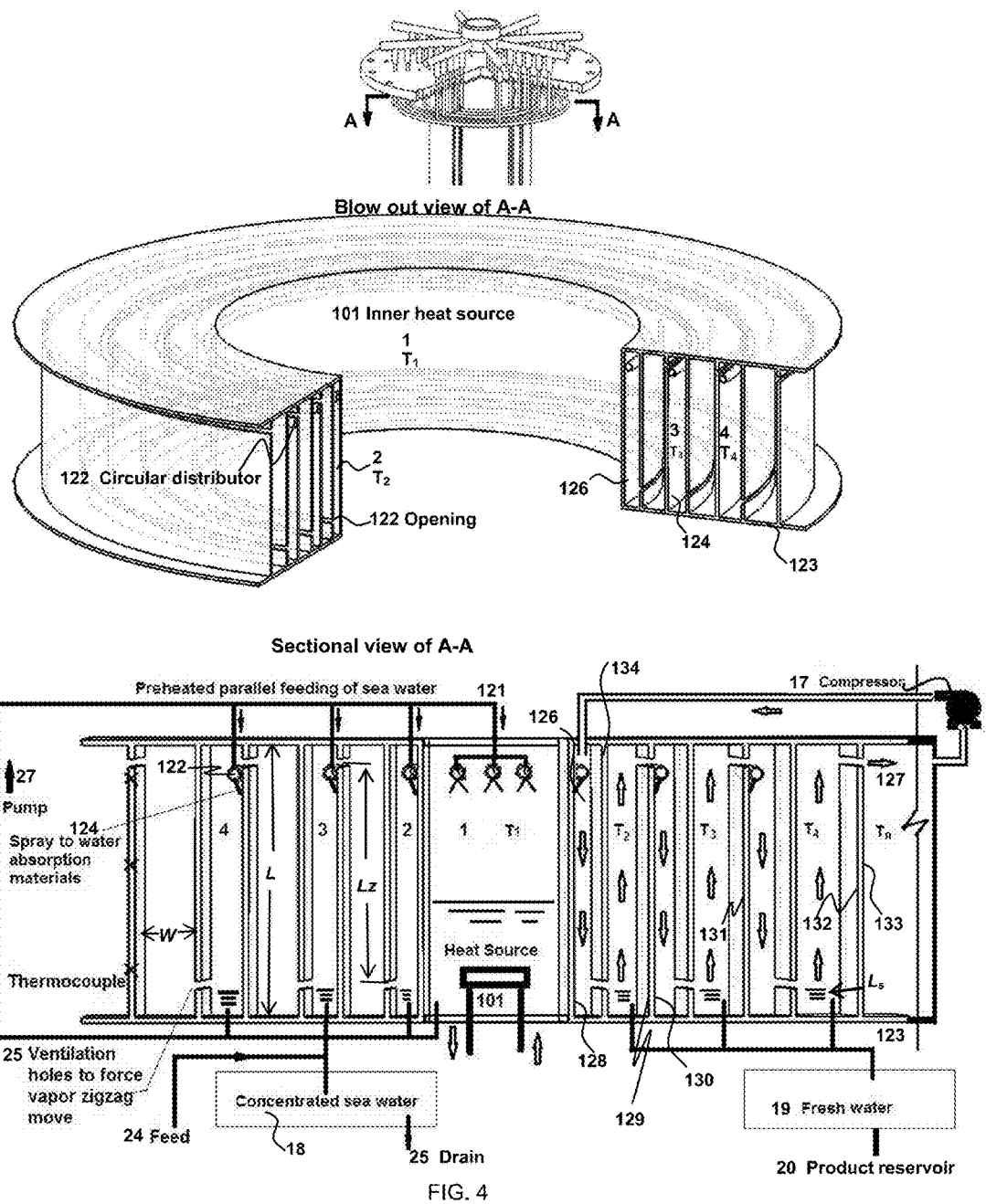
FIG. 4 is a blowout view and sectional view of on lines A-A of FIG. 3.

In addition, there is an axial seal present between stationary shell 120 and generator 14. The compressor and turbine or screw expander shown in FIG. 3 are both radially fed and axially ported. In alternative embodiments there is provided a vertical fixed housing having an inner rotatable housing (described above as rotatable housing, not shown) such as a cylindrical rotatable housing. The rotatable housing is increased in size and is designed to be just smaller than the fixed housing. The larger diameter of the rotatable housing results in an increased linear speed and increased pressure, resulting in improved rotation of the rotatable housing. Alternatively, in another particular embodiment in accordance with the invention, it can be envisioned that a regenerative blower might be used in place of a compressor 17. An example of a possible regenerative blower that could be the commercially available REGENAIR® R4 Series by GAST (e.g. models R4110-2.). FIG. 4 is a blowout view and sectional view of on lines A-A of FIG. 3.

The system maintains a constant blowdown flow to prevent scaling and other accumulation in the system. Water level in head intake 101 is adjusted through a feedback control loop using level sensor Ls and valve to maintain proper water flow through the blowdown stream 126. Using a feedback control loop with level sensor Ls and valve, product stream is controlled to flow from concentrated sea water tank 25 to extract heat and cool product stream 127, then through compressor 17 and on out to compress the product stream back to 126 into chamber 2.

The drawings there is illustrated a further embodiment of the invention wherein the cylinders or plates are concentric in arrangement and are circular in configuration. With this arrangement an inner cylinder or plate 128 or the like of a circular or tubular configuration becomes the input cylinder from heat source 101 and the outer circular cylinder or plate 133 becomes the output plate. Intermediate cylinders or plates 130 and 131 each include the usual evaporation and condensation faces in opposed relationship to opposite faces on adjacent plates. The cylinder or plate 130 and 131 extend parallel and present opposed evaporation faces and collection faces thereby define a vapor chamber 3 therebetween. Plurality of the cylinders or plates is stacked between the heat input cylinder or plate and a heat output cylinder or plate. This defines a plurality of effects or vapor chambers between the input side and output side of the unit from chamber 1~4 with the temperature from $T_1$ to $T_4$.

With this arrangement, the heat input would be at the center of the unit with the heat flowing radially outward across the circular vapor chambers to the next larger circular plate. With this arrangement, the outer cylinder or plate 133 has a much larger radiating surface for the radiation of the heat from the system. Again this heat from the circular cylinder or plate however is recovered by use in compressing vapor back into the system. Such circular systems may have numerous advantages in certain applications. Certain design modifications may be necessary in some instances to control the thickness of the thin film of water or other liquid on the evaporating faces. Certain advantages of this configuration include the increasingly larger surfaces outward from the central input plate. This has significant advantages when very high temperatures or heat input at the center is contemplated.

The invention in its broadest aspects includes the establishment of opposed parallel evaporation and condensation cylinders or plates defining multiple adjacent vapor chambers and establishing a temperature gradient across the chambers from a heat input side to a heat output side. The walls of the chambers defining the opposed evaporation and condensation faces are disposed at three possible positions: horizontally which is relying on the bottom holes to using gravity, vertically or at an angle from 5°~89° to permit gravity flow of a thin film down the surface of the evaporator plate. And the flowing of the condensate from the face of the condensation cylinder or plate is managed into collection chambers 18 and 19 respectively. In other related embodiments, the fins/ribs can be vertically disposed along the inner surface of the cylinders or plates at a downwardly angle. Techniques and methods and apparatus are utilized and arranged to establish a temperature differential for driving the distillation process in a continuous fashion utilizing the heat input to the system with minor heat losses resulting in very high efficiency and production rates from the system. A number of effects can be essentially defined as the number of chambers defined in this system through which a given amount of heat flows during the separation process. The number of effects can also be defined as the number of heat or energy utilizations in the system. The temperature gradient or heat flux across the unit will be determined or established by the number of effects of the system. In essence, the structure of the invention comprises a series of vapor chambers or effects disposed adjacent to one another having common walls and through which the heat of the system or process flows in the process of vaporizing and condensing the liquids within or passing through the system. The heat introduced into the system acts to vaporize a portion of the first layer of film on the first vaporizing or evaporation cylinder or plate and that heat is transferred by condensation on the adjacent cylinder or plate for vaporizing a portion of the liquid in that chamber. This process continues throughout the various chambers or effects with vapor zigzag movement to have the invented dynamic distillation system which is better than stationary prior art. The energy introduced into the system is repeatedly reused as it passes from cylinder or plate to cylinder or plate throughout the system.

Various parameters within the system can be varied to vary the rate and volume of production in proportion to the heat input. Certain parameters have been found to be critical and/or have critical ranges in order for the system to properly function. The system balances the heat and fluid input and provides an essentially balanced system. Vapor is zigzag moved from cylinder or plate to adjacent cylinder or plate by self-driven through the vapor pressure differences caused by thermal gradient that is inherently present with the distillation process. In FIG. 4, $L_z/L$ should be at least 0.1 which means zigzag is at least 10% of the length of the height. Usually, we assume 2~40 effects involved because the typical temperature difference required is 2° C. With 40 layers, it is 80° C. If the outer shell is 35° C., and the inner heat input is 115° C., the 40 layers or effects will reduce the energy requirement by 40-fold. Each chamber is maintained at a controlled pressure by allowing airtight to exist in the chambers. The pressure can be from 0.2 atm which is sub atmosphere to 1.5 atm and we will explain this later. The partial pressure of water reduces with lowering of temperature, but partial pressure of air increases to maintain atmospheric pressure conditions. This type system therefore requires no pressure control for operation and for construction considerations. There is illustrated a view of sea water circular distributor 122 are disposed between the respective cylinders or plates. The distributor system includes passageways extending from the sea water reservoir 18 to the respective cylinder or plate. After the distillation, it is separated by the lower end of the separator 123. Any form of communication or passageway which opens at its lower end onto the back side of the cylinder or plate with means for preventing flow of the liquid onto the opposing face of the next adjacent panel would be satisfactory. In the instant arrangement the lower edge 130 is collected to the sea water reservoir 18 while the lower edge 131 is collected to the fresh water reservoir 19. Since water does not uphill, this prevents the flow of water across the separator 123 from the passageway onto the adjacent plates.

The rate of flow of the water onto the evaporation face of the cylinder or plate is critical and may be controlled by means of the passageway size and/or other means. Means for catching or collecting the condensate at the lower end of the condensing surface includes a tray or chamber 19 at the lower end of each of the condensing surfaces having an upper opening with one wall extended up spaced therefrom and spaced from the back side or evaporation face of the adjacent plate. The film of water on the evaporation face of the cylinder or plate flows down the cylinder or plate to and off the lower end thereof and into a reservoir 18. The condensate on the condensing face of the cylinder or plate flows downward along the face and into the collection tray or chamber 19. These trays then convey the condensate or product into a collection manifold and then to suitable storage or the like. In operation of the device, it is set up to receive solar energy then spray pre-heated fluid onto the heat source 101 and cylinder or plate 128. A liquid to be distilled, such as salt water for example, is pumped onto the feed reservoir 18 and a controlled flow of the sea water is passed onto the back side of the cylinders or plates 128, 130 in a thin film. This thin film of water receives the heat transmitted through the cylinder or plate as it flows downward, and the temperature of the thin film increases in proportion to the heat directed thereto and begins to vaporize into the vapor 126 in chamber 2 or space between cylinders or plates 128 and 129. The vapor passes by diffusion and pressure difference to cylinder or plate 130 and 131 condensing on the face of cylinder or plate 131 transferring the heat of vaporization thereto upon condensation in chamber 3. The heat of vaporization from this process passes through cylinder or plate 128 to the face 129 thereof 130 and into the thin film of water passing therealong. This thin film begins to vaporize reaching a stable condition sending off vapor into and across the space between the cylinders or plates. This vapor between the cylinders or plates passes across the space and condenses onto the face of the next adjacent cylinder or plate 132 which is cooler. This process continues throughout the system. The system reaches an equilibrium condition with a temperature differential between the input and output side causing the vapor flow driven force by pressure gradient through the system.

The film of water flowing on the back side of cylinders or plates 128 and 130 is fed at a rate proportioned to the output thereof to assure that a continuous flow or film of the fluid will remain on and flow off the end of the lower edge of the plate. This continuous thin film is important to maintain a continuous exposure and a small mass of the water for vaporization. The close spacing of cylinders or plates also reduces the distance that vapor must travel to the condensing face. This continuous flow off the end of all cylinder or plate is also important in salt water distillation in that it continuously flushes the system preventing the precipitation of the salt onto the surface of the plate. The space between the cylinders or plates 128, 129 and adjacent cylinders or plates has been found to be critical to obtain optimum performance. A range of from 0.3 inch to 1 inch space between cylinders or plates has been found preferable for water distillation. Often the distance of layer interval is in equal. However the unequal distance of layer interval is preferred, this will be explained in FIG. 12 later. The space affects mass transfer, i.e. transfer rate of vapor across the space. For other conditions and for certain liquids a spacing of up to two or three inches may be practical. The use of pressures lower than atmospheric pressure can increase the efficiency of the system by reducing the resistance of the vapor flow across the space. This increase in mass transfer is the result of reduction of the partial pressure of air thereby reducing vapor flow resistance. Vacuum within the system would permit a higher rate of mass transfer of the vapors between the plates. In addition, the temperatures within the system necessary for vaporization of the water are about 85 degree C. if vacuum is used. The use of pressures higher than atmospheric pressure with 115 degree C. can increase the efficiency of the system by increasing the number of stages up to 40 layers. This increase is the result of increasing the temperature range between the first and last plates. Other modifications can include provision of an atmosphere of gasses other than air, such as hydrogen and helium for example. It has been found that the use of hydrogen and helium will also speed this mass transfer rate and significantly affect the efficiency of the system. Hydrogen and helium would increase the mass transfer rate (or heat flux) by a factor of approximately 3.3 and 3 receptively. The system without airtight can still work but it is at 30% efficiency of that of the vacuumed one.

Figure 5:
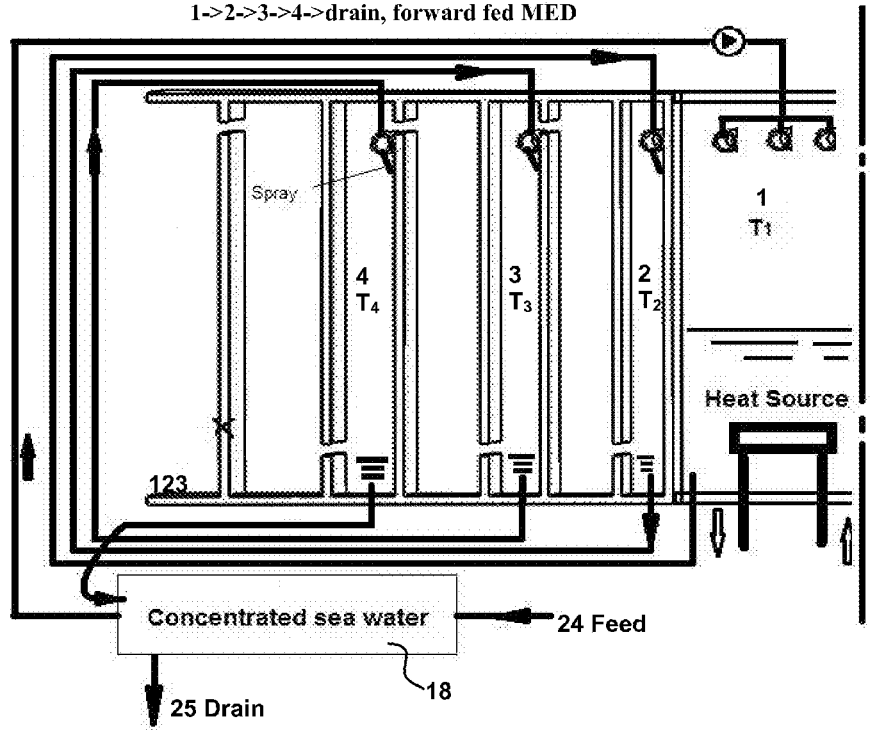
FIG. 5 is a side elevational view in section of an alternate embodiment of the invention with forward and backward fed MED.
Figure 5:
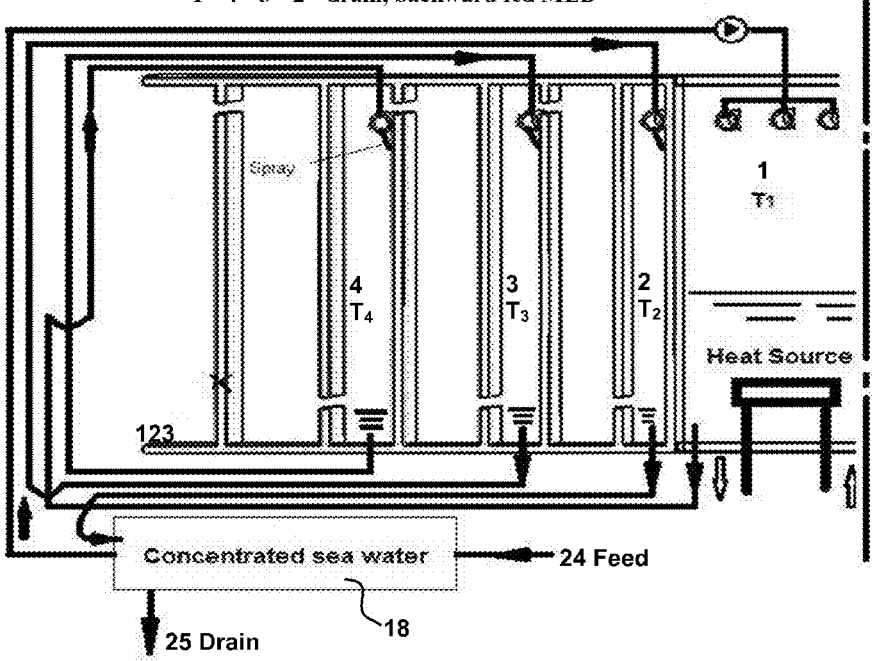

FIG. 5 is other specific embodiment of feeding system of the present invention: FIG. 5 is a side elevational view in section of an alternate embodiment of the invention with forward and backward fed MED. The top figure has a feeding flow path as 1->2->3->4->drain, this is forward fed MED. The bottom figure has a feeding flow path as 1->4-

>3->2->drain, this is backward fed MED. People can use parallel or forward or backward or combined configuration to have this system designed.

Figure 6:
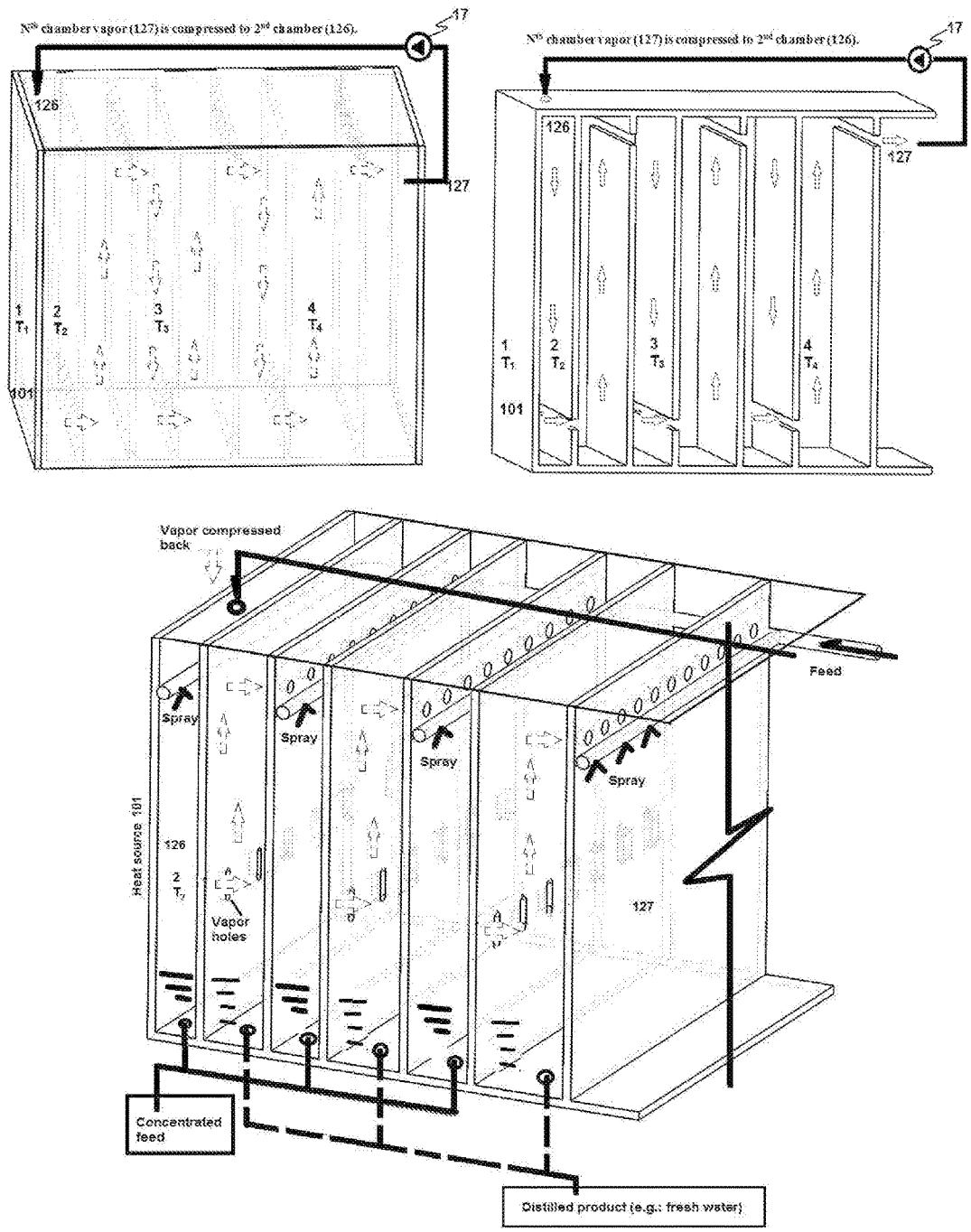
FIG. 6 is a side elevational view of an alternate embodiment of the invention with rectangular shape.

FIG. 6 is a side elevational view of an alternate embodiment of the invention with rectangular shape. The cut-cross section is in rectangular shape.

Figure 7:
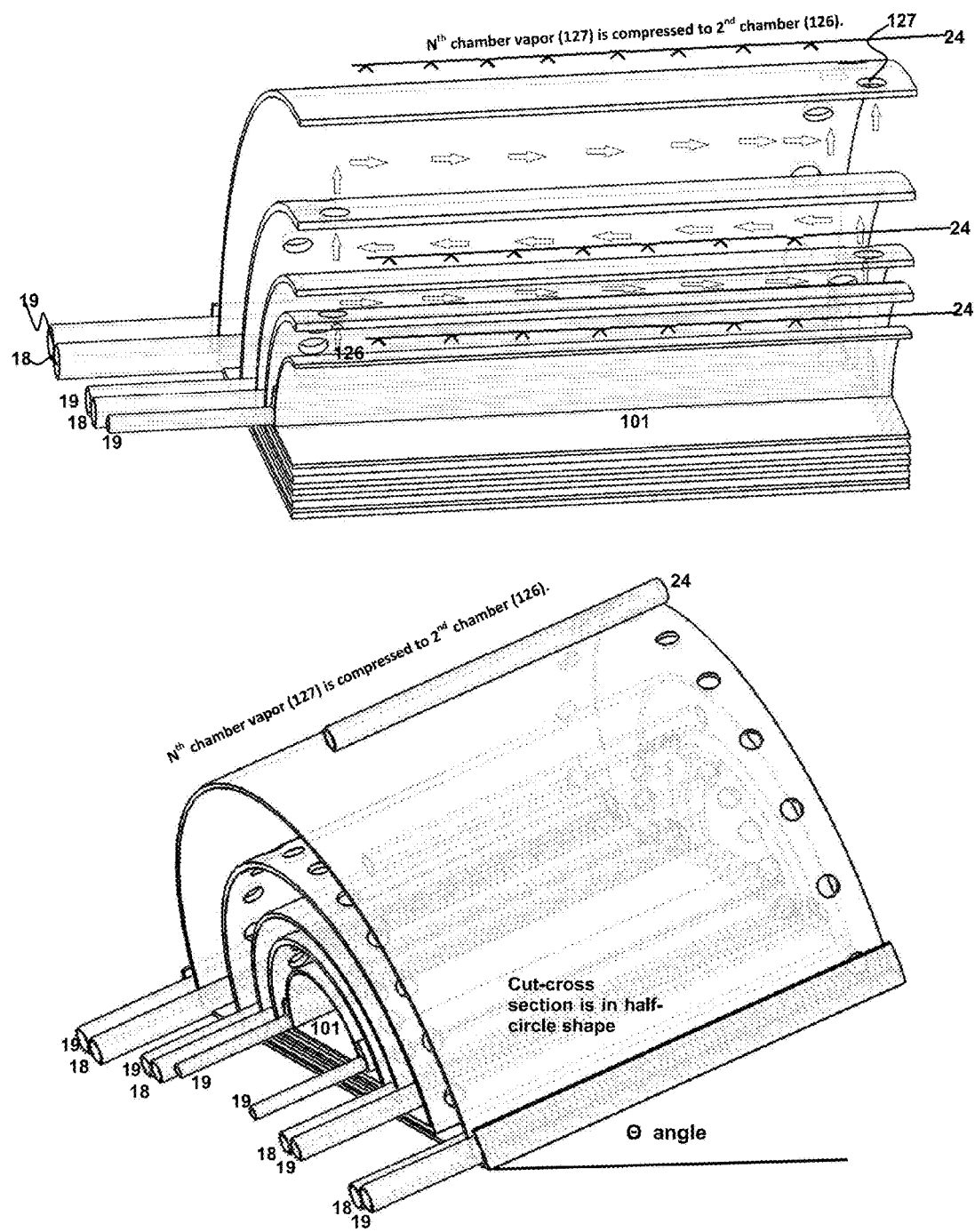
FIG. 7 is a side elevational view of an alternate embodiment of the invention with half circular shape.

FIG. 7 is a side elevational view of an alternate embodiment of the invention with half circular shape. The cut-cross section is in half-circle shape. FIGS. 6 and 7 are other specific embodiment of the present invention. This will be explained further in FIG. 11.

Figure 8:
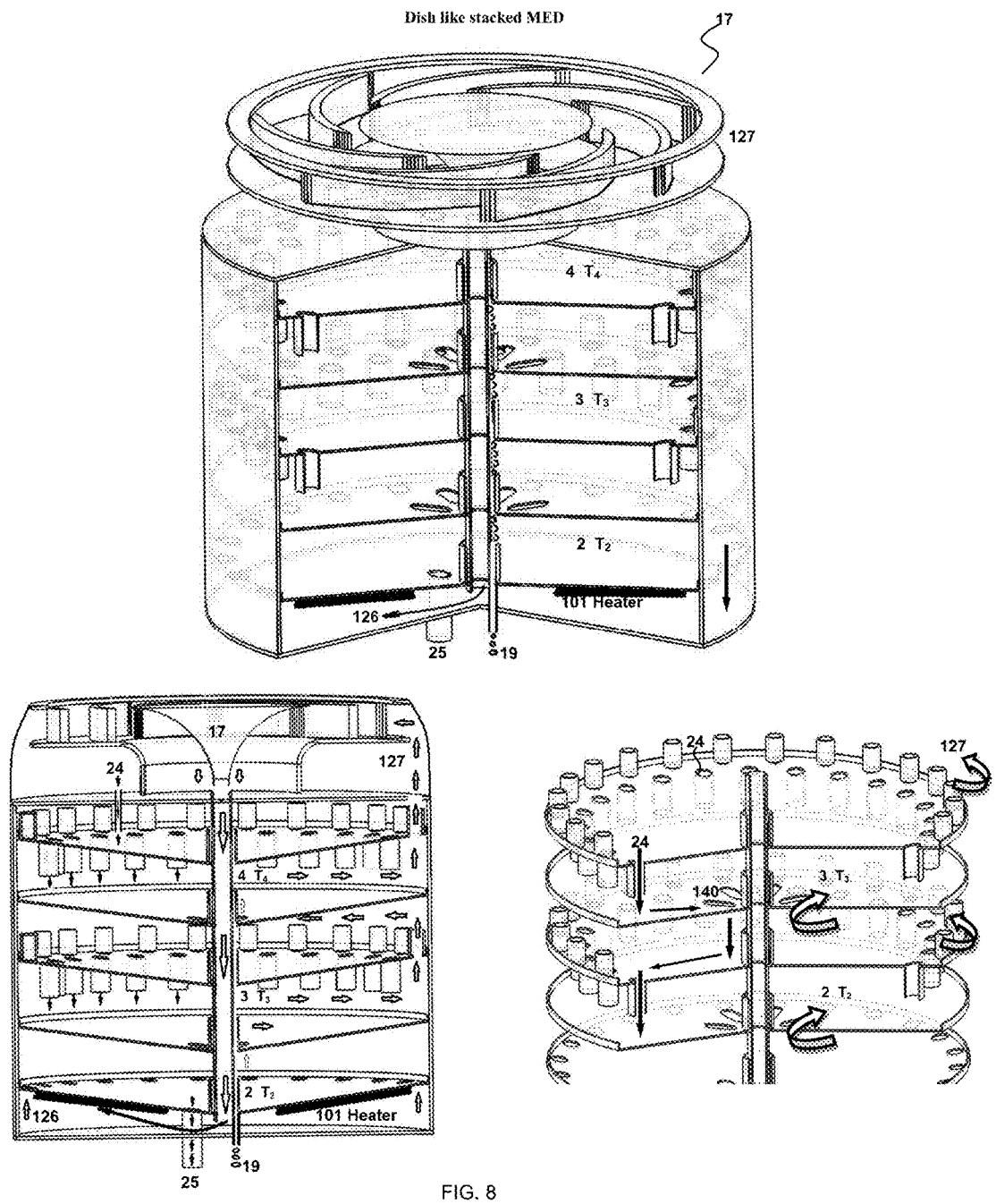
FIG. 8 is a side elevational view of an alternate embodiment of the invention with dish like stacked shape.

FIG. 8 refer to dish like MED apparatus 12 embodying this invention. It is composed of several inwardly sloping condensing chambers 2,3 and 4 substantially vertically piled up or superposed coaxially in a container where the last stage vapor 127 is compressed back to the heater chamber to be reused as 126. Internal elements are dish-like and have a slight downward slope at the lower part of an inwardly sloping bottom diaphragm forming part of each condensing element, from the edge toward the center, where an opening is provided that widens or diverges upwardly. Each diaphragm also has a vertical discharge pipe 24 (see FIG. 8), the bottom of which leads to the substantially planar top or rim of the successive condensing therebelow. The lowermost condensing element leads to an outlet tube 19. The condensing elements are piled coaxially, a receiver being provided under the lowest place, and a drain pipe 25 is provided with the receiver. A schematically shown heat source 101 is provided under the lowest element, or alternatively a recompressed hot vapor 127 is provided (both shown in FIG. 8) which supplies as heater (not shown) through the container 1 to the top or rim of the chamber 2, 3 and 4. In addition, an inlet or feed tube 24 is provided on the top, which supplies the sea water. Considering the above-described structure, this apparatus is quite similar to conventional rectification apparatus comprising plural piled trays and the temperature distribution which changes downwardly and the heat movement in this apparatus resembles those of the conventional rectification apparatus. However the difference exists in that vapor is made to condense on the surfaces of the bottom diaphragms, having slight inward slopes in this inventive apparatus, along which the condensed water is gathered at the center, and is led to the outside (e.g. to tube 19).

The condensate falls into the condensing chamber if the water gathering action is expected only by the way of gravity. So the surface tension operating to the diaphragm surface is strengthened in the film growth of the condensed water. Therefore, the bottom diaphragms are made of copper or aluminum material meshed or woven layers provided. Drop-wise condensation does not occur as the water gathering is increased by the obtained surface tension. Capillary meshed or woven layers diameter follows the formula as: $d=4\sigma/\Delta P$, where $\sigma$ is the fluid surface tension and $\Delta P$ is the differential between the absolute hydrostatic pressure of the higher of the pressures of evaporating or condensing liquid and the absolute pressure of the vapor within the pores.

Ribs are preferred is the dishes and the optimum spacing of the ribs has been found to be from between 0.3 inch to 1 inch between the ribs. The height of the ribs is also found to be about 0.015 inches high and about 0.015 inches wide. The rib can be formed as ridge on the face of the plate, or simply as an added strip. The dishes or plates are preferably made of a high heat conducting material to also enhance the efficiency of the system. Suitable materials for the dishes or plates include copper, aluminum, stainless steel and similar materials which would each have certain advantages and disadvantages include the lower heat conducting capabilities. The film thickness of the mass of water on the plate's evaporative face should be on the order of approximately 0.005 inches over the entire plate. The thin film reduces the mass of liquid that must be heated in order to induce vaporization. The thin film in a spread out condition exposes the water flow to a large area upon which evaporation is dependent. The thickness of the film 0.005 inches should be maintained to allow the liquid film to quickly adjust in temperature to create a temperature gradient from dish or plate to plate. One approach to the control of the feeding 24 down into the hole 140 while the vapor 127 turning around to zigzag path to be 126 shown in FIG. 8.

Bottom of the dish or plate use a wick disposed. The material can be selected to provide the appropriate feed rate of the water onto or through the system. In the simplified version of the solar system, sea water is maintained in the feed reservoir at a minimum level by use of a simple overflow line which returns flow of water to the lower reservoir. Proper manifold is used to cover the compressor to compress the rejected vapor back to be 126. This would make optimum use of the energy or heat supplied to the system in that the feed system. The feed sea water 24 is then fed in a controlled manner onto the evaporated faces of the various dishes or plates as heat is introduced into the system.

Figure 9:
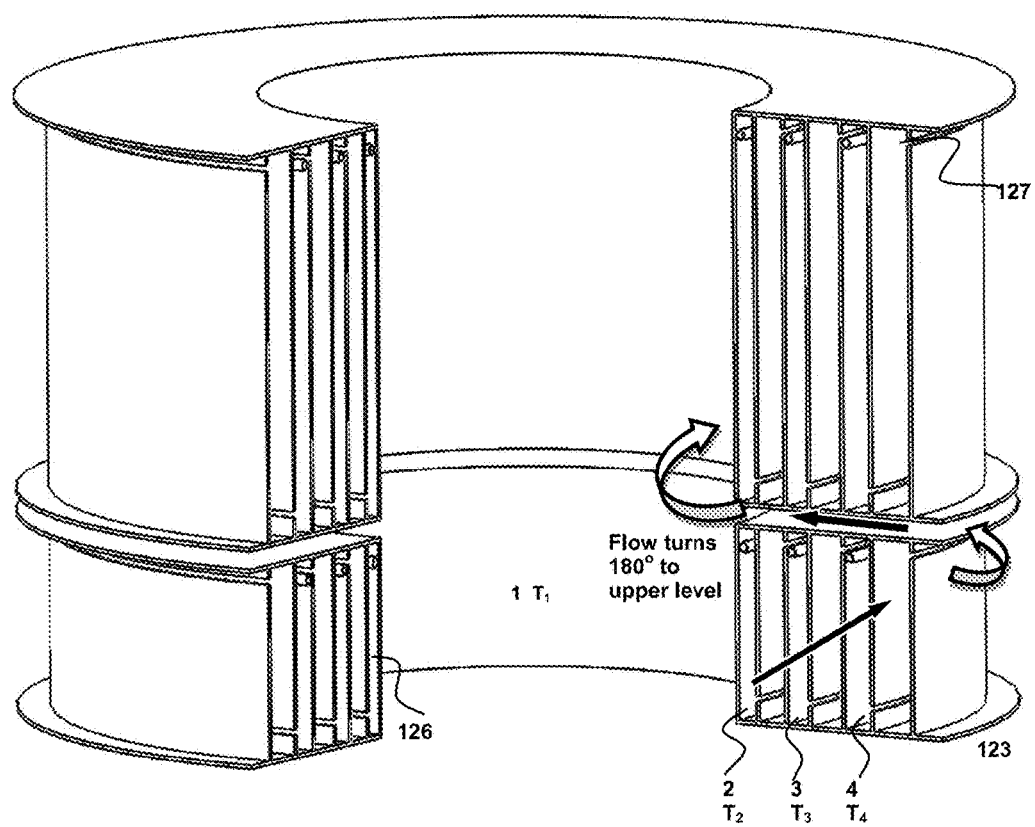
FIG. 9 is an elevational view of an alternate embodiment of the invention with 2-level.

FIG. 9 is an elevational view of an alternate embodiment of the invention with 2-level. There might be difficulty to build a pure "flat" single level 40-effect unit due to machining techniques required in flat 40-effect is much higher than 4-effect here shown. All 40 layer cylinders have to be laser-accurate to avoid leaking between different layers if the top and bottom cover has deformation. To avoid 40 layer deformations, we invent to build two-level (20+20=40) or three-level (14+13+13=40) configuration to realize 40-layer effect (FIG. 9). The vapor flow can relay from the first level to the higher level. The flow has 180° turns and transfers its heat to a higher level.

Figure 10:
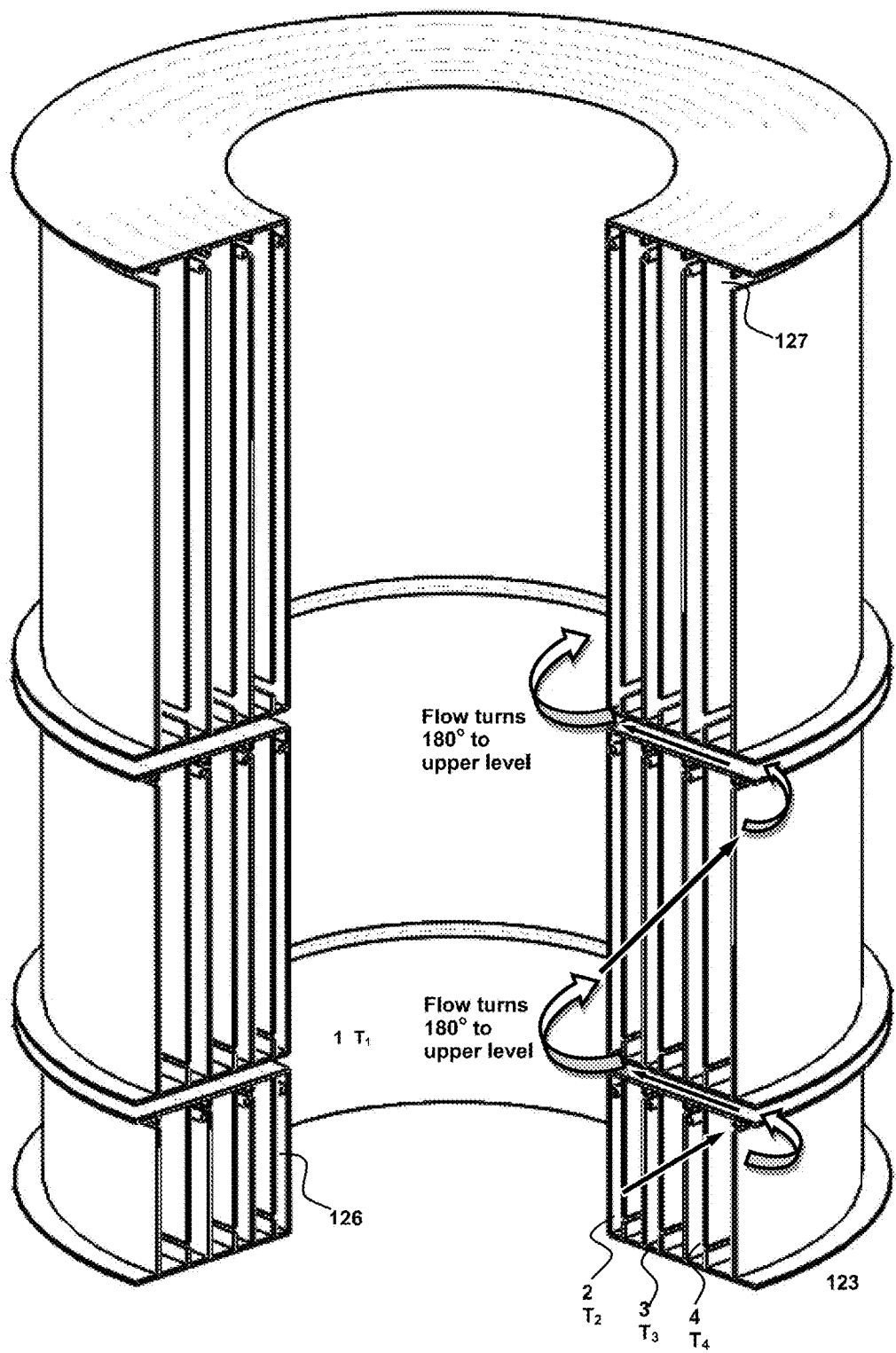
FIG. 10 is an elevational view of an alternate embodiment of the invention with 3-level.

FIG. 10 is an elevational view of an alternate embodiment of the invention with 3-level. Such a 2-level or 3-level configuration during the condensation process can be used to evaporate sea water at a lower pressure and to repeat this process 40 times under sub-atmosphere about 0.2 atm.

Figure 11:
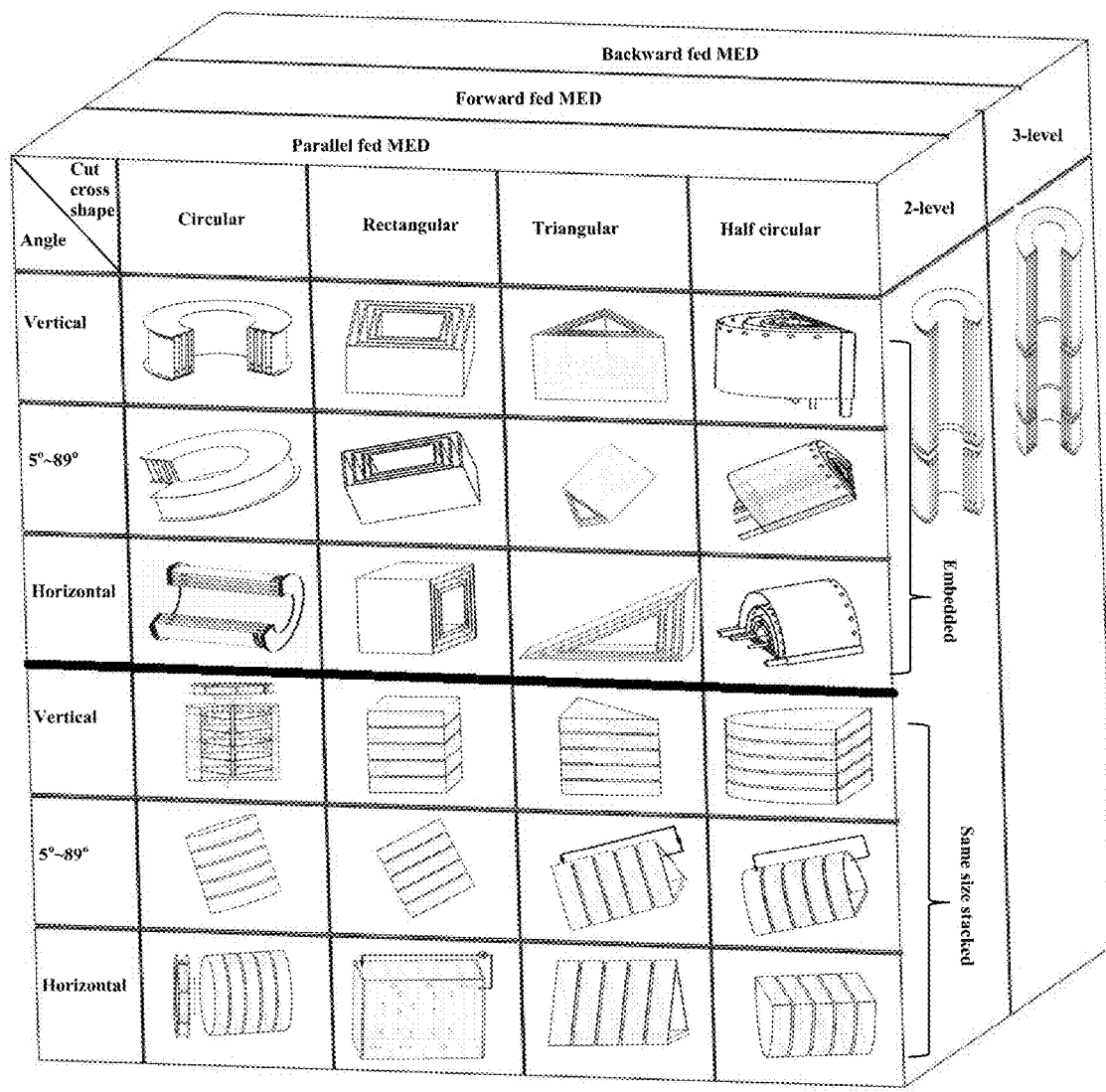
FIG. 11 is design combinations for further embodiment of the invention.

FIG. 11 is design combinations for further embodiment of the invention.

For a distillation system utilizing a solar system, the built could have many combinations from our invention. For the embedded structures, there are four cut-cross shapes: circular, rectangular, triangular and half-circular. For the same size stacked structures, there are four cut-cross shapes: circular, rectangular, triangular and half-circular as well. 2-level or 3-level configuration during the condensation process can be integrated into the system too. In addition, there are three feeding method: parallel, forward and backward fed MED. As we explained before, the walls of the chambers defining the opposed evaporation and condensation faces are disposed at three possible positions: horizontally which is relying on the bottom holes to using gravity, vertically or at an angle from 5°~89° to permit gravity flow of a thin film down the surface of the evaporator plate. And the flowing of the condensate from the face of the condensation cylinder or plate is managed into collection chambers 18 and 19 respectively (FIG. 4).

The cylinders or plates of distillation system are preferably disposed an angle θ(FIG. 7) to the horizontal to obtain the maximum benefit. Θ typically is from 5° to 89°. Preferably the cylinder or plate will be tilted at right angles to the sun for maximum absorption of solar energy. The remaining cylinders or plates will be similarly disposed at a similar angle. The cylinders or plates however, are oriented somewhat vertically such that gravity flow of the liquid will take place on the surfaces of the plates. The cylinders or plates are formed and extend between the feed water and collection chamber or reservoir such that the liquid is appropriately passed therebetween. The cylinders or plates are preferably formed to have a vertically extended upward end to ease the flow of liquid onto the back surface or evaporation face of the plates. Therefore the system is provided with means for flowing the liquid onto the back of the cylinders or plates in a thin film. The illustrated approach includes the curving of the upper end of cylinder or plate, for example, to extend vertically with similar upper ends of the cylinders or plates and the cylinder or plate. The end of the cylinder or plate extends into a position or into the bottom of collections as 18 and 19 respectively.

As previously discussed the heat 101 can be introduced in any suitable manner, such as by steam or the like, through a heat exchanger, or electrical energy or any other suitable source of heat. For simplicity and illustrative purposes, a pair of electrical heating elements 101 are illustrated which introduces heat from an electrical source into water in the FIG. 8. This could be applied to any type of configurations in FIG. 11 as well. The heat vaporizes the water which condenses on the faces of the cylinders or plates transferring heat thereto which is transferred through the cylinder or plate onto the evaporating surfaces and into the thin film of liquid flowing down that surface. The larger number of cylinders or plates will result in a more efficient use of the energy source by the larger number of recoveries within the system. Therefore, the system becomes more efficient (in terms of energy utilization) with increasing number of effects. The above described embodiment may be said to be a 2~40 layers unit with pairs of opposed identical sets of cylinders or plates arranged such that the heat input chamber is disposed adjacent to the input plates.

It has been calculated that a system in accordance with this arrangement the size upwards from a 270-270,000 gallons per day of fresh water from seawater as follows.

| | | | Dimension | |
|---|---|---|---|---|
| Size | m³/day | Capacity (~Gallon/day) | Typical Application | Diameter (m) | Length (m) |
| 1 | 0.1 | 270 | Distiller | 0.25 | 0.6 |
| 2 | 1 | 541 | Distiller/Ship | 0.6 | 0.9 |
| 3 | 3 | 800 | Ship | 0.8 | 1.1 |
| 4 | 30 | 8000 | Ship/Island/Utility | 1.7 | 1.7 |
| 5 | 100 | 27000 | Ship/Island/Utility | 1.7 | 5 |
| 6 | 300 | 80000 | Island/Utility | 1.7 | 15 |
| 7 | 1000 | 270000 | Island/Utility | 1.7 | 50 |

Such units could be mobile and could be moved (FIG. 2) to and from areas where brackish or salt water supplies are available for the transformation of such water into potable water. These systems can also be utilized in factories, such as oil refineries and the like, chemical refineries and manufacturing facilities for the separation of various phases of liquids, such as the various components of crude oil and the like. Appropriate adjustment in size of the unit heat input and control of the heat flow and liquid flow through the unit provides an optimum efficiency of the units. The apparatuses can be made of aluminum or copper-nickel alloy or stainless steel or other heat-transferable material.

Figure 12:
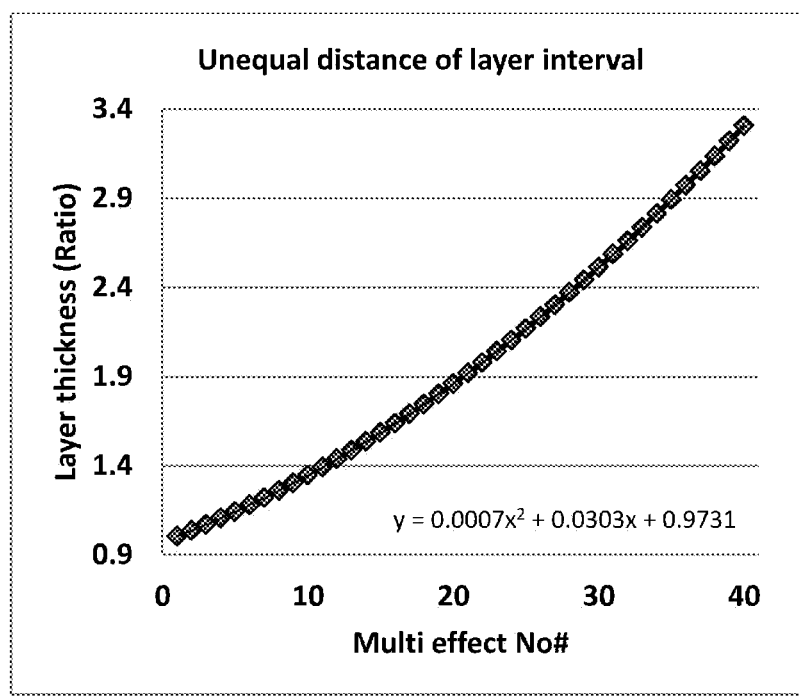
FIG. 12 is a graph showing the effect of layer thickness w vs. the number of effects.

FIG. 12 is a graph showing the effect of layer thickness W (in FIG. 4) vs. the number of effects or plates. The relationship between the surface heat flux and the number of cylinders or plates required is inversely proportional. With a very high heat flux, a very low number of cylinders or plates can be utilized to achieve successful and efficient results. With such a system the establishment of a sufficiently high heat flux and the optimum number of plates, only a single pass through the system may be necessary to remove the desirable components from the water. For this reason, the unequal distance of layer interval is preferred. And this is plotted in FIG. 12.

Figure 13:
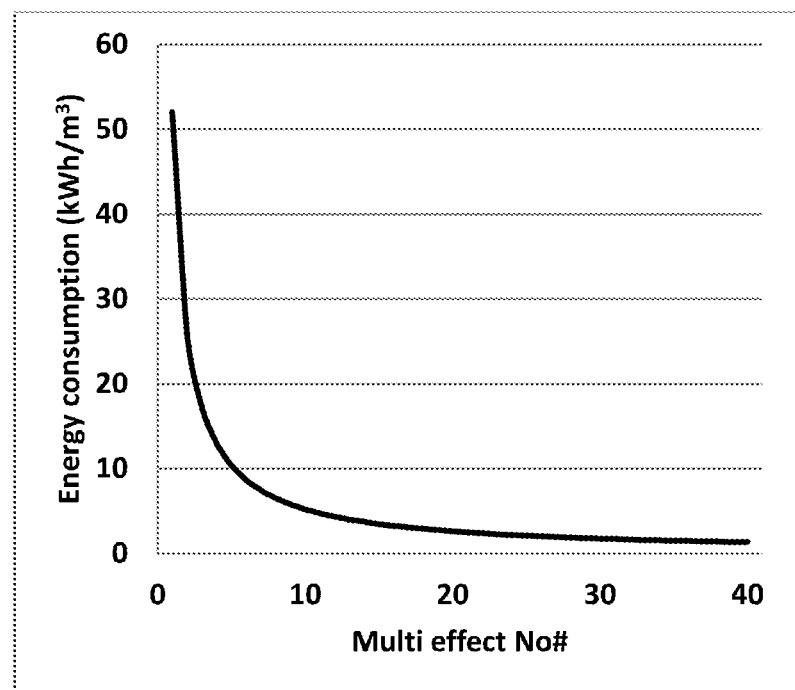
FIG. 13 is a graph showing the effect of energy consumption ($kWh/m^3$) vs. the number of effects or plates.

FIG. 13 is a graph showing the effect of energy consumption (kWh/m³) vs. the number of effects or plates. As previously discussed, the number of cylinders or plates or effects through the system varies, preferably with the heat flux of the system. As illustrated in FIG. 13, there is plotted energy consumption (kWh/m³), against the number of effects. It will be seen that for low energy systems, such as with flat cylinder or plate solar collectors, it can utilize up to 40 or more cylinders or plates or effects. The maximum temperature of the input cylinder or plate will depend upon the boiling point of the liquid fed through the system.

Figure 14:
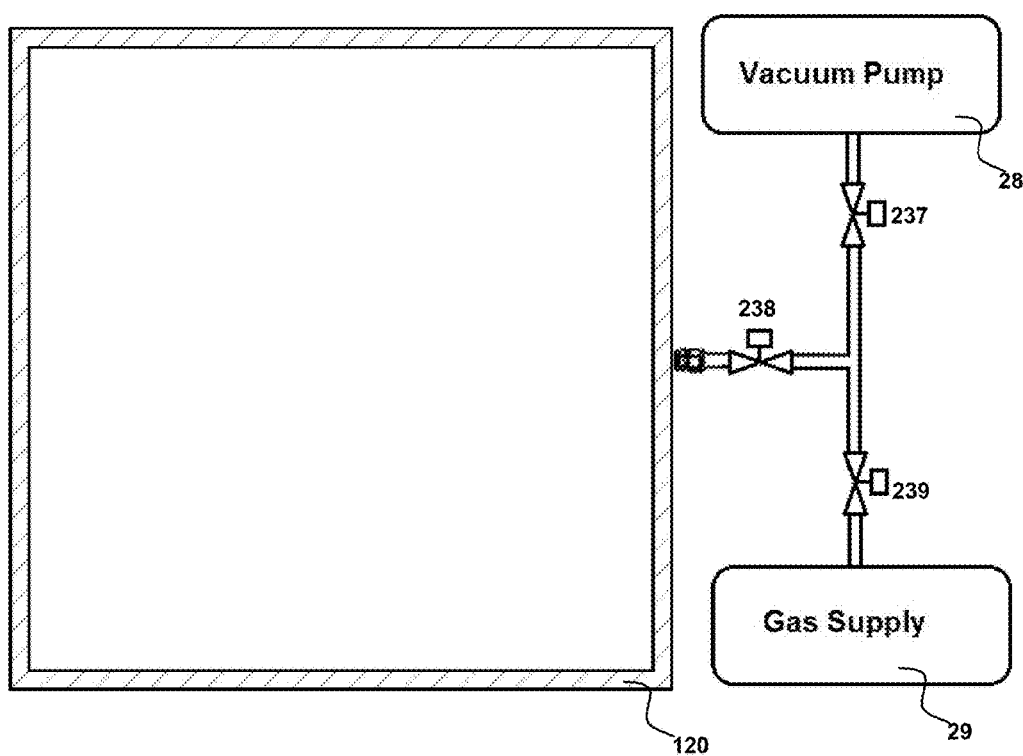
FIG. 14 is a schematic view of a system with pressure control.

FIG. 14 is a schematic view of a system with pressure control. There is illustrated a further modification of the invention wherein a MED 12 such as previously described is enclosed within a gas type chamber or housing 120 for controlling the pressure and the amount of air within the system. It is important to appreciate that one advantage of the present invention is that it can be carried out at atmospheric pressures in the presence of atmospheric air without special pressure chambers and support structures for the evaporating cylinders or plates and surfaces. In the presence of atmospheric air, the pressure equalizes on the cylinder or plate and the vapor pressure of the distilled liquid passes through the air between the plates, thus the pressure therein consists of the vapor pressure and partial atmospheric pressure. With a system such as schematically illustrated in FIG. 14, the atmospheric pressure can be reduced to be 0.2 atm. This can increase the production rate of the system by at least 3-fold. In a similar manner, it can be enclosed within a pressure chamber supplied a selected gas from a source 29 by way of a control conduit 239. With this arrangement, a gas having a higher diffusion coefficient can be introduced into the system, thus again increasing the rate of diffusion across the space between the plate, and thus increasing productivity of the system. Thus, the parameters within the system can be varied to achieve various desired results or can be varied to balance or offset other variables within the system. It is also important to note that the thickness of the thin film will depend on the viscosity of the liquid making up the film. Higher viscosity will in general, require thicker film. It should again be emphasized that the system of the present invention does not require high pressure vessels or structures.

It is here illustrated and described the invention by means of several specific embodiments, it is to be understood that numerous changes and modifications may be made therein without departing from the spirit and scope of the invention, as defined in the appended claims.

The invention claimed is:

1. A multiple effect diffusion distillation system comprising:
    a heat source fluidly connected a thermal energy source;
        a turbine or screw expander in operative connection with a power generator;
    a working fluid selected from the group consisting of Freon_and organic high molecular mass fluid, fluidly connected and introduced into a compressor wherein said heat source is coupled to a generator and turbine or screw expander providing energy to the heat source;

a multiple effect distillation apparatus including a feed water inlet and distilled water outlet said MED further including a plurality of cylinders or plates having a zig-zag configuration which is fluidly connected to a regenerative compressor fluidly connected to said MED providing steam or vapor from said MED which is in fluid connection with an evaporator, the evaporator further including a distilled water outlet;

said system including at least one variable flow valve coupled to at least one capacitive level sensor and controlled by a controller for controlling the multiple effect diffusion distillation system.

2. A multiple effect with vapor zig-zag path distillation system comprising:

a plurality of evaporative cylinders, diaphragms or plates spaced apart defining a chamber having zig-zag vapor path with opposed evaporating and condensing faces;

cylinders or plates being disposed at an angle to enable gravity flow of a liquid along said faces from the upper end to the lower end;

distributing feed by spraying a thin film or liquid onto said evaporating face adjacent the upper end at a predetermined controlled rate for effective evaporation;

condensation face for establishing a stable condensation;

separately collecting said concentration and condensate at the lower portion of the system.

3. A multiple effect distillation desalination system as claimed in claim 2, comprising:

at least three evaporating-condensing elements coaxially superposed in a vertical structure; a feed tube above the topmost one of said elements for introducing salty water to be desalinated;

the diaphragms having upwardly diverging inner walls with central ducts which constitute an axial vapor passageway to compress vapor back to the bottom chamber;

liquid-conveying discharge meeting with each of said elements evaporated along zig-zag liquid path down to the next lower element while vapor rising in a zig-zag flow to the top to be compressed, except for the lowermost one of said elements, which has instead a tube for discharging concentrated salty water and a heater or compressed vapor for heating.

4. The system of claim 1 wherein the spacing between said cylinders or plates is between 0.2 and 5 inches.

5. The system of claim 1 wherein said feed water is selected from the group consisting of groundwater, brackish water, crude oil, chemicals and mixtures thereof.

6. The system of claim 2 including 0.2 to 2.5 atmospheric pressure in said chambers.

7. The system of claim 2 wherein said cylinders or plates are disposed at an angle of between 2°-89° from the horizontal.

8. The system of claim 2 comprising at least three heat transfer cylinders or plates and up to forty heat transfer cylinders.

9. The system of claim 2 wherein a meshed or woven layer is attached to said walls of the distillation cylinders or plates or diaphragms for maintaining said thin film wherein said cylinders plates or diaphragms comprises a plurality of parallel ribs.

10. The system of claim 2 wherein said MED evaporative cylinders, plates or diaphragms are configured from four cut-cross shapes selected from the group consisting of circular, rectangular, triangular and half-circular; and said four cross cut shapes can be used in a stacked distillation structure in a 2-level or 3-level configuration.

11. The system of claim 2 wherein said liquid film thickness is up to 0.5 inches.

12. The system of claim 2 wherein the system is filled with non-condensing gas so that said vapor is diffused through said gas.

13. The distillation system of claim 2 wherein said heat input cylinder or plate is centrally disposed within said plurality of cylinders or plates and including an heat output cylinder or plate on each side of said input plate.

14. The distillation system of claim 2 including at least a pair of centrally disposed heat input cylinders or plates having a space there between and a pair of spaced apart heat output cylinders or plates disposed outwardly of the input cylinders or plates and having at least one intermediate cylinder or plate disposed between the input cylinders or plates and the output plates.

15. The system of claim 14 wherein heat is applied to said first cylinder or plate by heating or condensing vapor or compressed vapor on the face thereof.

16. The multiple effect distillation system of claim 2 wherein feeding a thin film of liquid onto said evaporating face comprises a circular distributor between pairs of said cylinders or plates at the upper end thereof and a feed channel communicating from a source of liquid to the lower end of said separator communicating with the evaporating face of said plate.

17. The system of claim 16 wherein said feed tubes are substantially extend along the evaporating face of said cylinder or plate and opens to opposite sides on said evaporating face.

18. The system of claim 2, further comprising a gas tight housing enclosing said system and controlling pressure between said cylinders and plates by different-sized openings and layer intervals.

19. The working fluid of claim 1 is Freon or organic high molecular mass fluid with boiling point from −50 to 400° C.

* * * * *